(12) United States Patent
Abd Elhamid et al.

(10) Patent No.: US 7,883,819 B2
(45) Date of Patent: Feb. 8, 2011

(54) HYBRID ELECTRICALLY CONDUCTIVE FLUID DISTRIBUTION SEPARATOR PLATE ASSEMBLY FOR FUEL CELLS

(75) Inventors: Mahmoud H. Abd Elhamid, Grosse Pointe Woods, MI (US); Youssef M. Mikhail, Sterling Heights, MI (US); Richard H. Blunk, Macomb Township, MI (US); John N. Owens, Franklin, MI (US); Daniel J. Lisi, Eastpointe, MI (US); Gayatri Vyas, Rochester Hills, MI (US)

(73) Assignee: GM Global Technologies Operations, Inc., Detroit, MI (US)

( * ) Notice: Subject to any disclaimer, the term of this patent is extended or adjusted under 35 U.S.C. 154(b) by 1511 days.

(21) Appl. No.: 11/215,394

(22) Filed: Aug. 30, 2005

(65) Prior Publication Data
US 2007/0048588 A1    Mar. 1, 2007

(51) Int. Cl.
*H01M 8/02* (2006.01)
(52) U.S. Cl. .................................... 429/483; 429/514
(58) Field of Classification Search .......... 429/30, 429/34, 36, 38, 483, 524, 514; 428/457
See application file for complete search history.

(56) References Cited

U.S. PATENT DOCUMENTS

| | | | |
|---|---|---|---|
| 4,214,969 A | 7/1980 | Lawrance | |
| RE37,284 E | 7/2001 | Li et al. | |
| 6,372,376 B1 | 4/2002 | Fronk et al. | |
| 6,607,857 B2 | 8/2003 | Blunk et al. | |
| 6,811,918 B2 | 11/2004 | Blunk et al. | |
| 6,827,747 B2 | 12/2004 | Lisi et al. | |
| 6,866,958 B2 | 3/2005 | Vyas et al. | |
| 7,344,794 B2 * | 3/2008 | Tanaka et al. | 429/34 |
| 2004/0062974 A1 | 4/2004 | Abd Elhamid et al. | |
| 2004/0081881 A1 | 4/2004 | Vyas et al. | |
| 2004/0157108 A1 * | 8/2004 | Blunk et al. | 429/42 |
| 2005/0142416 A1 * | 6/2005 | Takai et al. | 429/34 |
| 2005/0244700 A1 | 11/2005 | Abd Elhamid et al. | |
| 2006/0263666 A1 * | 11/2006 | Oku et al. | 429/34 |
| 2006/0263668 A1 * | 11/2006 | Mikhail et al. | 429/38 |

* cited by examiner

*Primary Examiner*—Jennifer Michener
*Assistant Examiner*—Monique Wills
(74) *Attorney, Agent, or Firm*—Brooks Kushman P.C.

(57) ABSTRACT

In at least one embodiment, the present invention provides an electrically conductive fluid distribution separator plate assembly, a method of making, and a system for using, the electrically conductive fluid distribution separator plate assembly. In at least one embodiment, the electrically conductive fluid distribution separator plate assembly comprises a metallic cathode plate having opposed surfaces and a first contact resistance, a polymeric composite anode plate adjacent to the metallic cathode plate, and a low contact resistance coating located on at least one of the surfaces of the plates, with the coating having a second contact resistance, less-than the first contact resistance.

11 Claims, 2 Drawing Sheets

HYBRID ELECTRICALLY CONDUCTIVE FLUID DISTRIBUTION SEPARATOR PLATE ASSEMBLY FOR FUEL CELLS

BACKGROUND OF THE INVENTION

1. Field of the Invention

The present invention relates generally to a hybrid electrically conductive fluid distribution separator plate assembly, a method of making a hybrid electrically conductive fluid distribution separator plate assembly, and systems using a hybrid electrically conductive fluid distribution separator plate assembly according to the present invention.

2. Background Art

Fuel cells are a known power source for many applications including vehicular applications. One such fuel cell is the proton exchange membrane or PEM fuel cell. PEM fuel cells are well known in the art and include in each cell thereof a membrane electrode assembly or MEA. Generally, the MEA is a thin, proton-conductive, polymeric, membrane-electrolyte having an anode electrode face formed on one side thereof and a cathode electrode face formed on the opposite side thereof. One example of a membrane-electrolyte is the type made from ion exchange resins. An exemplary ion exchange resin comprises a perfluoronated sulfonic acid polymer such as NAFION™ available from the E.I. DuPont de Nemeours & Co. The anode and cathode faces, on the other hand, typically comprise finely divided carbon particles, very finely divided catalytic particles supported on the internal and external surfaces of the carbon particles, and. proton conductive particles such as NAFION™ intermingled with the catalytic and carbon particles; or catalytic particles, without carbon, dispersed throughout a polytetrafluoroethylene (PTFE) binder.

Multi-cell PEM fuel cells typically comprise a plurality of the MEAs stacked together in electrical series and separated one from the next by a gas-impermeable, electrically-conductive fluid distribution plate known as a separator plate or a bipolar plate. Such multi-cell fuel cells are known as fuel cell stacks. The separator plate has two working faces, one confronting the anode of one cell and the other confronting the cathode on the next adjacent cell in the stack, and electrically conducts current between the adjacent cells. Electrically conductive fluid distribution plates at the ends of the stack contact only the end cells and are known as end plates. The separator plates, contain a flow field that distributes the gaseous reactants (e.g. $H_2$ and $O_2$/air) over the surfaces of the anode and the cathode. These flow fields generally include a plurality of lands which define therebetween a plurality of flow channels through which the gaseous reactants flow between a supply header and an exhaust header located at opposite ends of the flow channels.

A highly porous (i.e. ca. 60% to 80%), electrically-conductive material (e.g. cloth, screen, paper, foam, etc.) known as "diffusion media" is generally interposed between electrically conductive fluid distribution plates and the MEA and serves (1) to distribute gaseous reactant over the entire face of the electrode, between and under the lands of the electrically conductive fluid distribution plate, and (2) collects current from the face of the electrode confronting a groove, and conveys it to the adjacent lands that define that groove. One known such diffusion media comprises a graphite paper having a porosity of about 70% by volume, an uncompressed thickness. of about 0.17 mm, and is commercially available from the Toray Company under the name Toray 060. Such diffusion media can also comprise fine mesh, noble metal screen and the like as is known in the art.

In an $H_2$—$O_2$/air PEM fuel cell environment, the electrically conductive fluid distribution plates can typically be in constant contact with mildly acidic solutions (pH 3-5) containing $F^-$, $SO_4^{--}$, $SO_3^-$, $HSO_4^-$, $CO_3^{--}$, and $HCO_3^-$, etc. Moreover, the cathode typically operates in a highly oxidizing environment, being polarized to a maximum of about +1 V (vs. the normal hydrogen electrode) while being exposed to pressurized air. Finally, the anode is typically constantly exposed to hydrogen. Hence, the electrically conductive fluid distribution plates should be resistant to a hostile environment in the fuel cell.

Both metallic and polymeric composite separator plates have been used in the past. Examples of metallic fluid distribution plates can be found in U.S. Pat. Nos. 6,372,376, 6,866, 958, and RE37,284 and U.S. Patent Application Publication Nos. 2004/0081881 and 2004/0157108, which (1) are assigned to the assignee of this invention, and, (2) are incorporated herein by reference. Examples of polymeric composite fluid distribution plates can be found in U.S. Pat. Nos. 6,607,857, 6,811,918 and 6,827,747 and U.S. Patent Application Publication No. 2004/0062974, which (1) are assigned to the assignee of this invention, and (2) are incorporated herein by reference.

While metallic plates have been found to provide electrically conductive fluid distribution separator plates having acceptable corrosion resistance and contact resistance, metallic plates can be costly and applicants have found certain of them to be more susceptible to corrosion on the anode side of the membrane than composite plates. While polymeric composite plates have been found to provide electrically conductive fluid distribution separator plates having acceptable corrosion resistance and contact resistance, polymeric composite plates tend to have relatively poor mechanical properties (such as strength) when compared to metallic plates. While both metallic and polymeric composite plates are currently acceptable, there is a desire to provide an electrically conductive fluid distribution separator plate that overcomes at least one deficiency in the prior art.

SUMMARY OF THE INVENTION

In at least one embodiment, a hybrid electrically conductive fluid distribution separator plate assembly is provided comprising a metallic cathode plate having opposed surfaces and a first contact resistance, a polymeric composite anode plate having opposed surfaces and being adjacent the metallic plate, and a low contact resistance coating located on at least one of the surfaces, the coating having a second contact resistance, less than the first contact resistance.

In at least another embodiment, a method of manufacturing a hybrid electrically conductive fluid distribution separator plate assembly is provided. The method comprises providing a metallic cathode plate having opposed surfaces and a first contact resistance, and providing a composite anode plate having opposed surfaces adjacent the metallic plate, with at least one of the surfaces of the plates being coated with a low contact resistance coating having a second contact resistance, less than the first contact resistance.

In at least another embodiment, a fuel cell is providing comprising a first electrically conductive fluid distribution separator plate assembly comprising a metallic cathode plate having opposed surfaces and a first contact resistance with at least one of the surfaces being coated with a coating having a second contact resistance, less than the first contact resistance, and a composite anode plate adjacent the metallic cathode plate. The fuel cell further comprises a second electrically conductive fluid distributing separator plate assembly, and a membrane electrode assembly separating the first electrically conductive fluid distribution separator plate assembly and the second electrically conductive fluid distribution separator plate assembly, with the membrane electrode assembly comprising an electrolyte membrane, having a first side and a second side, an anode adjacent to the first side of the electrolyte membrane, and a cathode adjacent to the second side of the electrolyte membrane.

The present invention will be more fully understood from the following description of preferred embodiments of the invention taken together with the accompanying drawings. It is noted that the scope of the claims is defined by the recitations therein and not by the specific discussion of features and advantages, set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

The following description of the preferred embodiments is merely exemplary in nature and is in no way intended to limit the invention, its application, or uses. Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative bases for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and to normal grammatical variations of the initially defined abbreviation; and, unless expressly stated to the contrary, measurement of a property is determined by the same technique as previously or later referenced for the same property.

Figure 1:
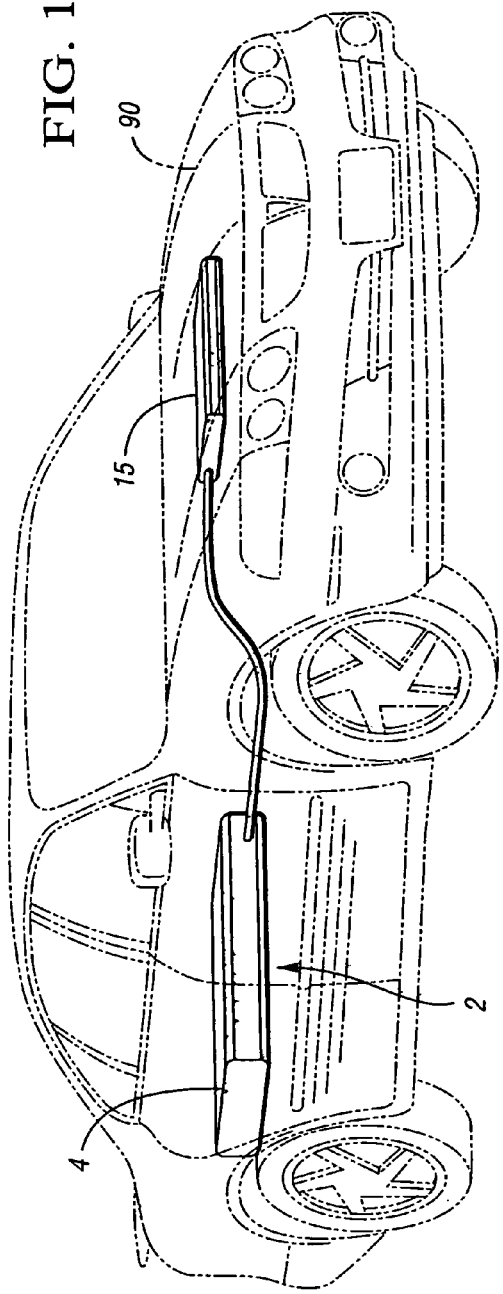
FIG. 1 is a schematic illustration of a vehicle including a fuel cell system.

Referring to FIG. 1, an exemplary fuel cell system 2 for automotive applications is shown. It is to be appreciated, however, that other fuel cell system applications, such as for example, in the area of residential systems, may benefit from the present invention.

In the embodiment illustrated in FIG. 1, a vehicle is shown having a vehicle body 90, and an exemplary fuel cell system 2 having a fuel cell processor 4 and a fuel cell stack 15. A discussion of embodiments of the present invention as embodied in a fuel cell stack and a fuel cell, is provided hereafter in reference to FIGS. 2-3. It is to be appreciated that while one particular fuel cell stack 15 design is described, the present invention may be applicable to any fuel cell stack designs where fluid distribution plates have utility.

Figure 2:
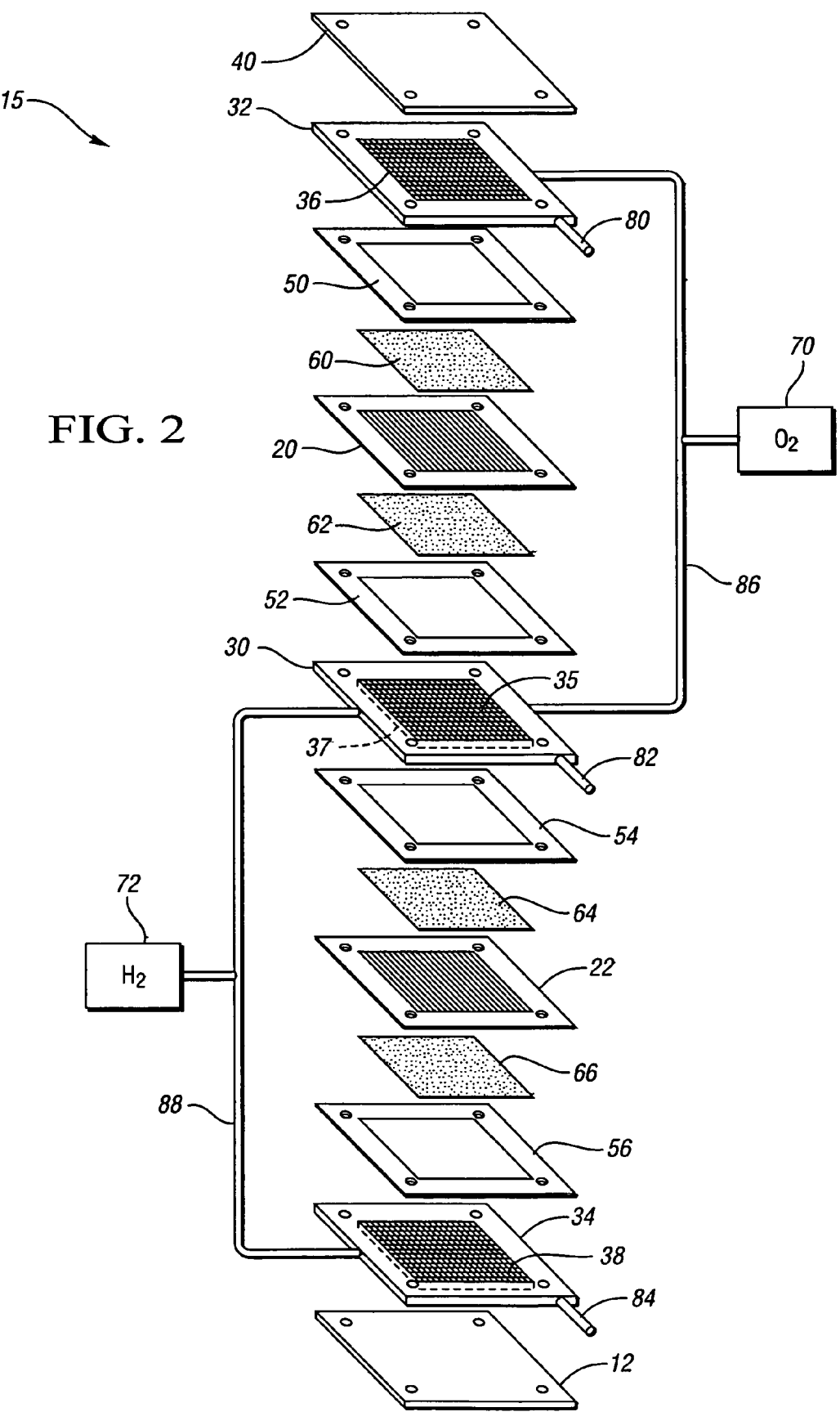
FIG. 2 is a schematic illustration of a fuel cell stack employing two fuel cells.

FIG. 2 depicts a two fuel cell, fuel cell stack 15 having a pair of membrane-electrode-assemblies (MEAs) 20 and 22 separated from each other by an electrically conductive fluid distribution plate assembly 30. Plate assembly 30 serves as a bi-polar or separator plate assembly having a plurality of fluid flow channels 35, 37 for distributing oxidant and fuel gases to the MEAs 20 and 22. By "fluid flow channel" we mean a path, region, area, or any domain on the plate assembly that is used to transport fluid in, out, along, or through at least a portion of the plate assembly. The MEAs 20 and 22, and plate assembly 30, may be stacked together between clamping plates 40 and 42, and electrically conductive fluid distribution plates 32 and 34. In the illustrated embodiment, plates 32 and 34 serve as end plates having only one side containing channels 36 and 38, respectively, for distributing oxidant and fuel gases to the MEAs 20 and 22, as opposed to both sides of the plate.

Nonconductive gaskets 50, 52, 54, and 56 may be provided to provide seals and electrical insulation between the several components of the fuel cell stack. Gas permeable carbon/graphite diffusion papers 60, 62, 64, and 66 can press up against the electrode faces of the MEAs 20 and 22. Plates. 32 and 34 can press up against the carbon/graphite papers 60 and 66 respectively, while the plate assembly 30 can press up against the carbon/graphite paper 64 on the anode face of MEA 20, and against carbon/graphite paper 60 on the cathode face of MEA 22.

In the illustrated embodiment, an oxidizing fluid, such as $O_2$, is supplied to the cathode side of the fuel cell stack from storage tank 70 via appropriate supply plumbing 86. While the oxidizing fluid is being supplied to the cathode side, a reducing fluid, such as $H_2$, is supplied to the anode side of the fuel cell from storage tank 72, via appropriate supply plumbing 88. Exhaust plumbing (not shown) for both the $H_2$ and $O_2$/air sides of the MEAs will also be provided. Additional plumbing 80, 82, and 84 is provided for supplying liquid coolant to the plate assembly 30 and plates 32 and 34. Appropriate plumbing for exhausting coolant from the plate assembly 30, and plates 32, and 34 is also provided, but not shown.

Figure 3:
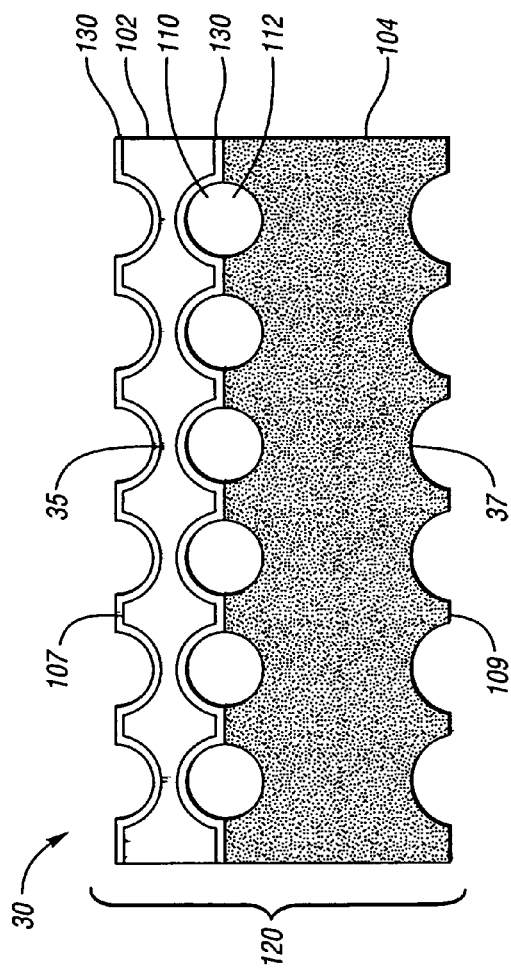
FIG. 3 is an illustration of an electrically conductive fluid distribution plate according to an embodiment of the present invention.

FIG. 3 illustrates an exemplary embodiment of an electrically conductive fluid distribution plate assembly 30. In this embodiment, the plate assembly 30 comprising a metallic cathode plate 102 and a polymeric composite anode plate 104. The plates 102, 104 include the plurality of fluid flow channels 35, 37 on their exterior sides/surfaces through which the fuel cell's reactant gases flow typically in a tortuous-path along one side of each plate. The plates 102, 104 also comprise a plurality of lands 107, 109, adjacent the channels 35, 37. The interior sides of the plates 102, 104 may include a second plurality of fluid flow channels 110, 112 through which coolant passes during the operation of the fuel cell. When the interior sides of the metallic cathode plate 102 and the polymeric composite anode plate 104 are placed together to form a plate body 120, the fluid flow channels 110, 112 connect and form a series of channels for coolant to pass through the plate assembly 30. An interior spacer sheet (not shown) may be positioned between the first and second plates 102, 104.

The metallic cathode plate 102 may be formed from a metal or metal alloy and has to be conductive. In one embodiment, a passivating metal or a passivating alloy forms the metallic cathode plate 102. By "passivating metal" or "passivating alloy" we mean a metal or an alloy that forms a passivating layer as a result of reaction with ambient substances such as air or water. However, if a passivating metal is to be used, in at least one embodiment, it is preferred that any formed passivating layer be relatively thin so as not to significantly increase the contact resistance of the plate assembly 30.

Suitable metals and metal alloys should be characterized by sufficient durability and rigidity to function as a cathode plate in a fluid distribution separator plate assembly in a fuel cell. Additional design properties for consideration in selecting a material for the cathode plate 102 include gas permeability, conductivity, density, thermal conductivity, corrosion resistance, pattern definition, thermal and pattern stability, machinability, cost and availability. Available metals and alloys include stainless steel, nickel based alloys, titanium and its alloys, and combinations thereof.

Since the metallic cathode plate 102 is not generally exposed to a relatively corrosive environment on the cathode side of the membrane, in at least one embodiment, the metallic cathode plate 102 can be made of economical, relatively low grades of stainless steel/alloys. In at least one embodiment, relatively low grades of stainless steel/alloys are defined as stainless steels and alloys having a combined content of molybdenum, chromium, and nickel that is less than 40% by weight of the total weight of the stainless steel, in another embodiment less than 30%, and in another embodiment less than 20%. Suitable examples of lower grades of stainless steel include, but are not necessarily limited to austenite steels, such as 316L ss, 304L, 201L, 202L, 216L, 309, 310 and others with 316L ss being particularly preferred to take advantage of its corrosion resistance, relatively low cost, and its relatively good mechanical properties.

The metallic cathode plate 102 may be formed by machining, rotary die forming, cutting, stamping, photo etching such as through a photolithographic mask, chemical etching or any other suitable design and manufacturing process.

In the schematically illustrated plate assembly 30 of FIG. 3, both of the working faces of the cathode plate 102 are covered with a low contact resistance coating 130. While both faces are illustrated as having coating 130 it is contemplated that only one of the working surfaces, such as surface having channel 35 for delivering cathode reactants to the cathode side of the membrane, can be coated with the low contact resistance coating 130. While the low contact resistance coating 130 can extend over substantially the entire outer surface of plate 102, as schematically illustrated in FIG. 3, it is contemplated that the low contact resistance coating. 130 can also extend over less than the entire outer surface. For instance, it is contemplated that only the lands of the cathode plate 102 could be coated with coating 130. Also, in at least one other embodiment, one or more working faces of the anode plate 104 can be coated, either totally or in part, with the low contact resistance coating 130 either in lieu of, or in addition to, coating, the cathode plate 102 with the coating 130.

In at least one embodiment, the low contact resistance coating 130 is a coating of material having a lower contact resistance than the metallic material of cathode plate 102. In at least one embodiment, the low contact resistance coating 130 comprises a metal layer comprising a noble metal. It is contemplated that the low contact resistance coating 130 can comprise a pure noble metal layer, other noble metal-containing alloy layers, and metal carbides, oxides and nitrides. In at least some embodiments, particularly suitable noble metals include gold, platinum, palladium, ruthenium, rhodium, rare earth metals and mixtures thereof. In at least certain embodiments, gold is especially suitable.

In at least one embodiment, the low contact resistance coating 130 has a thickness of less than 50 nm. In at least some embodiments, the low contact resistance coating 130 has a thickness of between 0.5 and 40 nm, and in yet other embodiments between 2 and 10 nm. While the low contact resistance coating 130 can be supplied to the cathode plate 102 in any suitable manner, one particularly suitable approach is to deposit the low contact resistance coating 130 onto cathode plate 102 via a physical vapor deposition process such as, for example, electron beam deposition or sputtering, or an electroplating process, thermal and kinetic spray, and chemical vapor deposition (CVD).

In the embodiment illustrated in FIG. 3, the anode plate 104 of the electrically conductive fluid distribution plate assembly 30 is made (e.g. molded) entirely of composite material. The composite material of the plate 104 can be any suitable conductive composite material for forming plates, such as a polymer composite material comprising 10% to 90% by weight electrically-conductive filler (e.g. graphite particles or filaments) dispersed throughout a polymeric matrix.

In at least one embodiment, the polymeric material of the composite anode plate 104 can comprise a thermosetting resin, a thermoplastic resin, or combinations thereof. Some suitable examples of thermosetting resin include, but are not necessarily limited to, epoxies, melamines, phenolics, ureas, vinyl esters, polyesters, polyamide-imides, polyether-imides, polyphenols, fluro-elastomers (e.g., polyvinylidine fluoride), phenoxy-phenolics, epoxide-phenolics, acrylics, urethanes and combinations thereof. Some suitable examples of thermoplastic resin include, but are not necessarily limited to, styrenes, acrylics, cellulosics, polyethylenes, polypropylenes, liquid crystalline polymers (polyesters), vinyls, nylons; fluorocarbons, polyphenylene sulfides, and combinations thereof.

Some suitable examples, of electrically-conductive filler include, but are not necessarily limited to, graphite particles, fibers, nano tubes and/or powder which graphite can be selected from synthetic graphite, natural graphite, and combinations thereof. Other suitable examples of electrically-conductive fibers, nano tubes include, but are not necessarily limited to, particles, fillers, and/or powder of gold, platinum, carbon, palladium, niobium, rhodium, ruthenium, the rare earth metals, and combinations thereof.

In at least one embodiment, the metallic cathode plate 102 and composite anode plate 104 each define a thickness that can differ given the mechanical properties of the metallic cathode and composite anode plates 102, 104. The composite material that makes up the anode plate 104 is typically comparably weaker than the metallic material of the cathode plate 102. This is at least partially because of the high loading of electrically conductive filler that is incorporated into the composite material to increase the electrical conductivity of the anode plate 104. As such, the metallic cathode plate 102 can have a thinner thickness than the composite anode plate 104.

As shown with more particularity in FIG. 3, the thickness of the metallic cathode plate 102 is less than the thickness of the composite anode plate 104. In at least one embodiment, the thickness of the anode plate 104 is at least twice the thickness of the cathode plate 102, and in at least another embodiment at least three times the thickness of the cathode plate 102. In at least one embodiment, the thickness of the metallic cathode plate 102 is between 0.075 and 0.3 mm, and in other embodiments between 0.1 and 0.2 mm. In at least one embodiment, the thickness of the composite anode plate 104 is between 0.3 and 1.5 mm, and in other embodiments between 0.6 and 1.0 mm.

What is commonly referred to as a bond line is present at the interface of the metallic cathode plate 102 and the polymeric composite anode plate 104. A relatively low bond line resistance is desirable to avoid voltage losses through the bond line. In at least one embodiment, the bond line resistance between the metallic cathode plate 102 and the composite anode plate 104 is less than 3 mohm-cm$^2$, and in another embodiment is between 1.8 and 2 mohm-cm$^2$. Accordingly, the present invention allows for the elimination of conventional bonding processes that are typically cost prohibitive for both metallic and composite plates.

An adhesive can be used around the perimeter of the metallic cathode plate 102 and composite anode plate 104 in order to seal the stack and help prevent coolant from leaking out from the plate assembly 30. The adhesive can be either conductive or non-conductive, and can be selected from a thermosetting resin, a thermoplastic resin, or combinations thereof, such as, for example, epoxies, phenolics, acrylics, urethanes, polyesters, etc. The adhesive can be applied using any one of the following processes: dispensing, screen printing, spray and roll coating etc. Alternatively, a gasket configured to prevent coolant from leaking out from the separator plate assembly 30 can be employed with or without the adhesive sealant. In accordance with the present invention, the direct contact between the composite anode plate 104 and the metallic cathode plate 102, with or without the use of the conductive or non-conductive adhesive around the outside perimeter of the plates 102, 104, maintains the integrity of the fuel cell stack and is cost effective.

In at least certain embodiments, a hybrid electrically conductive fluid distribution separator plate assembly 30 according to at least one of the embodiments of the present invention has excellent cost benefits. The use of the polymeric composite material in the manufacture of the anode plate 104 provides a separator plate assembly 30 with significantly less material cost than conventional entirely metallic plate assemblies, while still benefiting from the properties of metallic material. Furthermore, the use of a relatively thick polymeric composite plate 104 results in decreased processing cost from a lower scrap rate.

In at least certain embodiments, a hybrid electrically conductive fluid distribution separator plate assembly 30 according to at least one of the embodiments of the present invention has excellent corrosion resistance. The use of the polymeric composite material in the manufacture of the anode plate 104 provides a separator plate assembly having excellent resistance to corrosion on the anode side of the membrane. This can also aid in preventing coolant leakage.

In at least certain embodiments, a hybrid electrically conductive fluid distribution separator plate assembly 30 according to at least one of the embodiments of the present invention has excellent weight and volumetric power density. The use of the relatively thin metallic cathode plate 102 with the polymeric composite anode plate 104 provides a separator plate assembly 30 with a relatively high weight and volumetric power density, while still benefiting from the properties of polymeric composite material.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hybrid electrically conductive fluid distribution separator plate assembly comprising:
   a metallic cathode plate having opposed surfaces and a first contact resistance;
   a polymeric composite anode plate contacting the metallic cathode plate, the polymeric composite plate having opposed surfaces, the polymeric composite anode plate consisting of composite material having an electrically-conductive filler dispersed throughout a polymeric matrix; and
   a low contact resistance coating being located on at least one of the surfaces, the coating having a second contact resistance, less than the first contact resistance.

2. The plate assembly of claim 1, wherein the metallic cathode plate has a first thickness and the polymeric composite anode plate has a second thickness, greater than the first thickness.

3. The plate assembly of claim 2 wherein the polymeric composite anode plate has a thickness of 0.3 to 1.5 mm.

4. The plate assembly of claim 3 wherein the metallic cathode plate has a thickness of 0.1 to 0.3 mm.

5. The plate assembly of claim 1 wherein the metallic cathode plate comprises stainless steel having a combined content of molybdenum, chromium, and nickel of less than 40% by weight of the total weight of the stainless steel.

6. The plate assembly of claim 3 wherein the metallic cathode plate comprises austenite stainless steel.

7. The plate assembly of claim 1 wherein the coating comprises a noble metal.

8. The plate assembly of claim 7 wherein the noble metal is selected from the group consisting of gold, platinum, palladium, ruthenium, rhodium, rare earth metals, alloys thereof, and mixtures thereof.

9. The plate assembly of claim 7 wherein the coating is located on the cathode plate and has a thickness of between 0.5 and 40 nm.

10. The plate assembly of claim 1 wherein a bond line is disposed between the metallic cathode plate and the polymeric composite anode plate, the bond line resistance being less than 3 mohm-cm$^2$.

11. A fuel cell comprising:
    a first electrically conductive fluid distribution separator plate assembly comprising:
    a metallic cathode plate having opposed surfaces and a first contact resistance, at least one of the surfaces being coated with a coating having a second contact resistance, less than the first contact resistance; and
    a polymeric composite anode plate adjacent the metallic cathode plate, the polymeric composite anode plate consisting of composite material;
    a second electrically conductive fluid distributing separator plate assembly; and
    a membrane electrode assembly separating the first electrically conductive fluid distribution plate assembly and the second electrically conductive fluid distribution plate assembly, the membrane electrode assembly comprising:
    an electrolyte membrane, having a first side and a second side, an anode adjacent to the first side of the electrolyte membrane; and
    a cathode adjacent to the second side of the electrolyte membrane.

* * * * *